United States Patent
Kenworthy

(10) Patent No.: US 12,226,824 B2
(45) Date of Patent: Feb. 18, 2025

(54) THREE DIMENSIONAL PRINTER WITH CONFIGURABLE BUILD PLATE FOR RAPID POWDER REMOVAL

(71) Applicant: Divergent Technologies, Inc., Los Angeles, CA (US)

(72) Inventor: Michael Thomas Kenworthy, Rancho Palos Verdes, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 0 days.

(21) Appl. No.: 17/520,582

(22) Filed: Nov. 5, 2021

(65) Prior Publication Data
US 2022/0193779 A1 Jun. 23, 2022

Related U.S. Application Data

(60) Provisional application No. 63/129,426, filed on Dec. 22, 2020.

(51) Int. Cl.
*B22F 12/30* (2021.01)
*B22F 10/28* (2021.01)
(Continued)

(52) U.S. Cl.
CPC .............. *B22F 12/30* (2021.01); *B22F 10/28* (2021.01); *B22F 10/73* (2021.01); *B22F 12/52* (2021.01);
(Continued)

(58) Field of Classification Search
CPC .......... B22F 12/30; B22F 10/28; B22F 10/73; B22F 12/52; B22F 12/57; B22F 10/40;
(Continued)

(56) References Cited

U.S. PATENT DOCUMENTS

| 5,203,226 A | 4/1993 | Hongou et al. |
| 5,742,385 A | 4/1998 | Champa |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Rebecca Janssen
(74) *Attorney, Agent, or Firm* — ARENTFOX SCHIFF LLP

(57) ABSTRACT

Techniques for rapid powder removal in a 3-D printer are disclosed. In various embodiments, the 3-D printer has a build plate for supporting a build piece. The build plate includes first structures for supporting unfused powder on a top of the build plate when the first structures are in a closed configuration. The first structures can transition to an open configuration to expose paths for allowing the unfused powder to pass through the build plate, and a second structure for preventing the build piece from passing through the build plate when the first structures are in the open configuration. In various embodiments, the unfused powder can thereafter be replaced with cool powder to assist in forming a predictable microstructure that makes up the build piece.

24 Claims, 11 Drawing Sheets

(51) Int. Cl.
  *B22F 10/73* (2021.01)
  *B22F 12/52* (2021.01)
  *B22F 12/57* (2021.01)
  *B33Y 10/00* (2015.01)
  *B33Y 30/00* (2015.01)
  *B33Y 50/02* (2015.01)

(52) U.S. Cl.
  CPC ............. *B22F 12/57* (2021.01); *B33Y 10/00* (2014.12); *B33Y 30/00* (2014.12); *B33Y 50/02* (2014.12)

(58) Field of Classification Search
  CPC .......... B22F 12/55; B22F 10/68; B22F 12/37; B33Y 10/00; B33Y 30/00; B33Y 50/02; B33Y 40/00; B29C 64/153; B29C 64/245; B29C 64/329; B29C 64/35; B29C 64/357; B29C 64/40; Y02P 10/25
  See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |

(56) References Cited

U.S. PATENT DOCUMENTS

| | | | |
|---|---|---|---|
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |
| 9,802,108 | B2 | 10/2017 | Aders |
| 9,809,977 | B2 | 11/2017 | Carney et al. |
| 9,817,922 | B2 | 11/2017 | Glunz et al. |
| 9,818,071 | B2 | 11/2017 | Jung et al. |
| 9,821,339 | B2 | 11/2017 | Paschkewitz et al. |
| 9,821,411 | B2 | 11/2017 | Buller et al. |
| 9,823,143 | B2 | 11/2017 | Twelves, Jr. et al. |
| 9,829,564 | B2 | 11/2017 | Bruder et al. |
| 9,846,933 | B2 | 12/2017 | Yuksel |
| 9,854,828 | B2 | 1/2018 | Langeland |
| 9,858,604 | B2 | 1/2018 | Apsley et al. |
| 9,862,833 | B2 | 1/2018 | Hasegawa et al. |
| 9,862,834 | B2 | 1/2018 | Hasegawa et al. |
| 9,863,885 | B2 | 1/2018 | Zaretski et al. |
| 9,870,629 | B2 | 1/2018 | Cardno et al. |
| 9,879,981 | B1 | 1/2018 | Dehghan Niri et al. |
| 9,884,663 | B2 | 2/2018 | Czinger et al. |
| 9,898,776 | B2 | 2/2018 | Apsley et al. |
| 9,914,150 | B2 | 3/2018 | Pettersson et al. |
| 9,919,360 | B2 | 3/2018 | Buller et al. |
| 9,931,697 | B2 | 4/2018 | Levin et al. |
| 9,933,031 | B2 | 4/2018 | Bracamonte et al. |
| 9,933,092 | B2 | 4/2018 | Sindelar |
| 9,957,031 | B2 | 5/2018 | Golshany et al. |
| 9,958,535 | B2 | 5/2018 | Send et al. |
| 9,962,767 | B2 | 5/2018 | Buller et al. |
| 9,963,978 | B2 | 5/2018 | Johnson et al. |
| 9,971,920 | B2 | 5/2018 | Derakhshani et al. |
| 9,976,063 | B2 | 5/2018 | Childers et al. |
| 9,987,792 | B2 | 6/2018 | Flitsch et al. |
| 9,988,136 | B2 | 6/2018 | Tiryaki et al. |
| 9,989,623 | B2 | 6/2018 | Send et al. |
| 9,990,565 | B2 | 6/2018 | Rhoads et al. |
| 9,994,339 | B2 | 6/2018 | Colson et al. |
| 9,996,890 | B1 | 6/2018 | Cinnamon et al. |
| 9,996,945 | B1 | 6/2018 | Holzer et al. |
| 10,002,215 | B2 | 6/2018 | Dowski et al. |
| 10,006,156 | B2 | 6/2018 | Kirkpatrick |
| 10,011,089 | B2 | 7/2018 | Lyons et al. |
| 10,011,685 | B2 | 7/2018 | Childers et al. |
| 10,012,532 | B2 | 7/2018 | Send et al. |
| 10,013,777 | B2 | 7/2018 | Mariampillai et al. |
| 10,015,908 | B2 | 7/2018 | Williams et al. |
| 10,016,852 | B2 | 7/2018 | Broda |
| 10,016,942 | B2 | 7/2018 | Mark et al. |
| 10,017,384 | B1 | 7/2018 | Greer et al. |
| 10,018,576 | B2 | 7/2018 | Herbsommer et al. |
| 10,022,792 | B2 | 7/2018 | Srivas et al. |
| 10,022,912 | B2 | 7/2018 | Kia et al. |
| 10,027,376 | B2 | 7/2018 | Sankaran et al. |
| 10,029,415 | B2 | 7/2018 | Swanson et al. |
| 10,040,239 | B2 | 8/2018 | Brown, Jr. |
| 10,046,412 | B2 | 8/2018 | Blackmore |
| 10,048,769 | B2 | 8/2018 | Selker et al. |
| 10,052,712 | B2 | 8/2018 | Blackmore |
| 10,052,820 | B2 | 8/2018 | Kemmer et al. |
| 10,055,536 | B2 | 8/2018 | Maes et al. |
| 10,058,764 | B2 | 8/2018 | Aders |
| 10,058,920 | B2 | 8/2018 | Buller et al. |
| 10,061,906 | B2 | 8/2018 | Nilsson |
| 10,065,270 | B2 | 9/2018 | Buller et al. |
| 10,065,361 | B2 | 9/2018 | Susnjara et al. |
| 10,065,367 | B2 | 9/2018 | Brown, Jr. |
| 10,068,316 | B1 | 9/2018 | Holzer et al. |
| 10,071,422 | B2 | 9/2018 | Buller et al. |
| 10,071,525 | B2 | 9/2018 | Susnjara et al. |
| 10,072,179 | B2 | 9/2018 | Drijfhout |
| 10,074,128 | B2 | 9/2018 | Colson et al. |
| 10,076,875 | B2 | 9/2018 | Mark et al. |
| 10,076,876 | B2 | 9/2018 | Mark et al. |
| 10,081,140 | B2 | 9/2018 | Paesano et al. |
| 10,081,431 | B2 | 9/2018 | Seack et al. |
| 10,086,568 | B2 | 10/2018 | Snyder et al. |
| 10,087,320 | B2 | 10/2018 | Simmons et al. |
| 10,087,556 | B2 | 10/2018 | Gallucci et al. |
| 10,099,427 | B2 | 10/2018 | Mark et al. |
| 10,100,542 | B2 | 10/2018 | GangaRao et al. |
| 10,100,890 | B2 | 10/2018 | Bracamonte et al. |
| 10,107,344 | B2 | 10/2018 | Bracamonte et al. |
| 10,108,766 | B2 | 10/2018 | Druckman et al. |
| 10,113,600 | B2 | 10/2018 | Bracamonte et al. |
| 10,118,347 | B2 | 11/2018 | Stauffer et al. |
| 10,118,579 | B2 | 11/2018 | Lakic |
| 10,120,078 | B2 | 11/2018 | Bruder et al. |
| 10,124,546 | B2 | 11/2018 | Johnson et al. |
| 10,124,570 | B2 | 11/2018 | Evans et al. |
| 10,137,500 | B2 | 11/2018 | Blackmore |
| 10,138,354 | B2 | 11/2018 | Groos et al. |
| 10,144,126 | B2 | 12/2018 | Krohne et al. |
| 10,145,110 | B2 | 12/2018 | Carney et al. |
| 10,151,363 | B2 | 12/2018 | Bracamonte et al. |
| 10,152,661 | B2 | 12/2018 | Kieser |
| 10,160,278 | B2 | 12/2018 | Coombs et al. |
| 10,161,021 | B2 | 12/2018 | Lin et al. |
| 10,166,752 | B2 | 1/2019 | Evans et al. |
| 10,166,753 | B2 | 1/2019 | Evans et al. |
| 10,171,578 | B1 | 1/2019 | Cook et al. |
| 10,173,255 | B2 | 1/2019 | TenHouten et al. |
| 10,173,327 | B2 | 1/2019 | Kraft et al. |
| 10,178,800 | B2 | 1/2019 | Mahalingam et al. |
| 10,179,640 | B2 | 1/2019 | Wilkerson |
| 10,183,330 | B2 | 1/2019 | Buller et al. |
| 10,183,478 | B2 | 1/2019 | Evans et al. |
| 10,189,187 | B2 | 1/2019 | Keating et al. |
| 10,189,240 | B2 | 1/2019 | Evans et al. |
| 10,189,241 | B2 | 1/2019 | Evans et al. |
| 10,189,242 | B2 | 1/2019 | Evans et al. |
| 10,190,424 | B2 | 1/2019 | Johnson et al. |
| 10,195,693 | B2 | 2/2019 | Buller et al. |
| 10,196,539 | B2 | 2/2019 | Boonen et al. |
| 10,197,338 | B2 | 2/2019 | Melsheimer |
| 10,200,677 | B2 | 2/2019 | Trevor et al. |
| 10,201,932 | B2 | 2/2019 | Flitsch et al. |
| 10,201,941 | B2 | 2/2019 | Evans et al. |
| 10,202,673 | B2 | 2/2019 | Lin et al. |
| 10,204,216 | B2 | 2/2019 | Nejati et al. |
| 10,207,454 | B2 | 2/2019 | Buller et al. |
| 10,209,065 | B2 | 2/2019 | Estevo, Jr. et al. |
| 10,210,662 | B2 | 2/2019 | Holzer et al. |
| 10,213,837 | B2 | 2/2019 | Kondoh |
| 10,214,248 | B2 | 2/2019 | Hall et al. |
| 10,214,252 | B2 | 2/2019 | Schellekens et al. |
| 10,214,275 | B2 | 2/2019 | Goehlich |
| 10,220,575 | B2 | 3/2019 | Reznar |
| 10,220,881 | B2 | 3/2019 | Tyan et al. |
| 10,221,530 | B2 | 3/2019 | Driskell et al. |
| 10,226,900 | B1 | 3/2019 | Nevins |
| 10,232,550 | B2 | 3/2019 | Evans et al. |
| 10,234,342 | B2 | 3/2019 | Moorlag et al. |
| 10,237,477 | B2 | 3/2019 | Trevor et al. |
| 10,252,335 | B2 | 4/2019 | Buller et al. |
| 10,252,336 | B2 | 4/2019 | Buller et al. |
| 10,254,499 | B1 | 4/2019 | Cohen et al. |
| 10,257,499 | B2 | 4/2019 | Hintz et al. |
| 10,259,044 | B2 | 4/2019 | Buller et al. |
| 10,268,181 | B1 | 4/2019 | Nevins |
| 10,269,225 | B2 | 4/2019 | Velez |
| 10,272,860 | B2 | 4/2019 | Mohapatra et al. |
| 10,272,862 | B2 | 4/2019 | Whitehead |
| 10,275,564 | B2 | 4/2019 | Ridgeway et al. |
| 10,279,580 | B2 | 5/2019 | Evans et al. |
| 10,285,219 | B2 | 5/2019 | Fetfatsidis et al. |
| 10,286,452 | B2 | 5/2019 | Buller et al. |
| 10,286,603 | B2 | 5/2019 | Buller et al. |
| 10,286,961 | B2 | 5/2019 | Hillebrecht et al. |

(56) References Cited

U.S. PATENT DOCUMENTS

| | | |
|---|---|---|
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2002/0090410 A1 | 7/2002 | Tochimoto et al. |
| 2006/0108783 A1 | 5/2006 | Ni et al. |
| 2008/0241404 A1* | 10/2008 | Allaman .............. B29C 64/357 118/308 |
| 2014/0277669 A1 | 9/2014 | Nardi et al. |
| 2015/0224712 A1 | 8/2015 | Tjellesen et al. |
| 2015/0258744 A1* | 9/2015 | Muller ................ B08B 7/028 264/37.29 |
| 2017/0113344 A1 | 4/2017 | Schönberg |
| 2017/0341142 A1 | 11/2017 | Ackelid |
| 2017/0341309 A1 | 11/2017 | Piepenbrock et al. |
| 2020/0079028 A1 | 3/2020 | Miller et al. |
| 2021/0252803 A1 | 8/2021 | Bucknell et al. |
| 2022/0314545 A1* | 10/2022 | Bromberg ............. B29C 64/236 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US21/58679, mailed Feb. 1, 2022, 10 pages.
European Search Report Received for European Patent Application No. 21911835.3, mailed on Nov. 22, 2024, 12 pages.

\* cited by examiner

THREE DIMENSIONAL PRINTER WITH CONFIGURABLE BUILD PLATE FOR RAPID POWDER REMOVAL

CROSS-REFERENCE TO RELATED APPLICATION

This application claims the benefit of, and right to priority to, U.S. Provisional Patent Application No. 63/129,426, filed Dec. 22, 2020 and entitled "Three Dimensional Printer With Configurable Build Plate For Rapid Powder Removal", the contents of which are expressly incorporated by reference as if fully set forth herein.

BACKGROUND

Field

The present disclosure relates generally to additive manufacturing ("AM") systems, and more particularly, to techniques for rapid powder removal in three dimensional (3-D) printers.

Background

AM systems, also described as 3-D printers, can produce structures (referred to as build pieces) with geometrically complex shapes, including some shapes that are difficult or impossible to create using conventional manufacturing processes. AM systems, such as laser-based, electron beam-based, and other powder bed fusion (PBF) systems or material-fed systems, create build pieces layer-by-layer. In PBF systems, each layer is formed by (i) dispensing metal powder or other material to a powder bed in a dispensing procedure, (ii) forming a layer of the material across a powder bed during a re-coat cycle, and (iii) exposing portions of the material to an energy beam during an exposure cycle, the latter of which is also referred to herein as a print cycle. During the exposure (print) cycle, a controller selectively applies the energy beam to fuse areas of the layer that coincide with the cross-sections of the build piece. The process is repeated as the material is progressively dispensed from a hopper, and each layer is formed and selectively fused over the previous layer. The resulting structure is a build piece assembled layer-by-layer from the ground up.

Various challenges persist in the art, and result in specific shortcomings with respect to the management of powder and other material in the course of printing a structure. These and other shortcomings are addressed in the disclosure that follows.

SUMMARY

Several aspects of apparatuses and methods for rapid powder removal using configurable build plates in 3-D printers will be described more fully hereinafter.

In various aspects, a three-dimensional (3-D) printer includes a build chamber configured for a build plate, a hopper for storing first powder, a depositor connected to the hopper, the depositor for depositing sequential layers of the first powder into a powder bed on the build plate, and an energy beam source for selectively fusing the deposited layers to form a build piece, whereby unfused first powder remains in the powder bed, wherein the build plate includes first structures for supporting the unfused first powder on a top of the build plate when the first structures are in a closed configuration and that transition to an open configuration to expose paths for allowing the unfused first powder or portion thereof to pass through the build plate, and a second structure for preventing the build piece from passing through the build plate when the first structures are in the open configuration.

In various aspects, a method for three-dimensional (3-D) printing including a build chamber configured for a build plate, a hopper for storing first powder, a depositor connected to the hopper for depositing sequential layers of the first powder into a powder bed on the build plate, and an energy beam source for selectively fusing the deposited layers to form a build piece, whereby unfused first powder remains in the powder bed, the method including supporting, using first structures, the unfused first powder on a top of the build plate when the first structures are in a closed configuration, transitioning the first structures to an open configuration to expose paths for allowing the unfused first powder or portion thereof to pass through the build plate, and preventing, using a second structure, the build piece from passing through the build plate when the first structures transition to the open configuration.

In various aspects, a build plate for a three-dimensional (3-D) printer, the 3-D printer including a build plate at its base, and an energy source for selectively fusing the layers of powder to form a build piece, the build plate comprising first structures for supporting unfused first powder on a top of the build plate when the first structures are in a closed configuration and that transition to an open configuration to expose paths for allowing the unfused first powder to pass through the build plate, and a second structure for preventing the build piece from passing through the build plate when the first structures are in the open configuration.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of rapid powder removal and exchange in additive manufacturing will now be presented in the detailed description by way of example, and not by way of limitation, in the accompanying drawings, wherein.

DETAILED DESCRIPTION

Figure 1A:
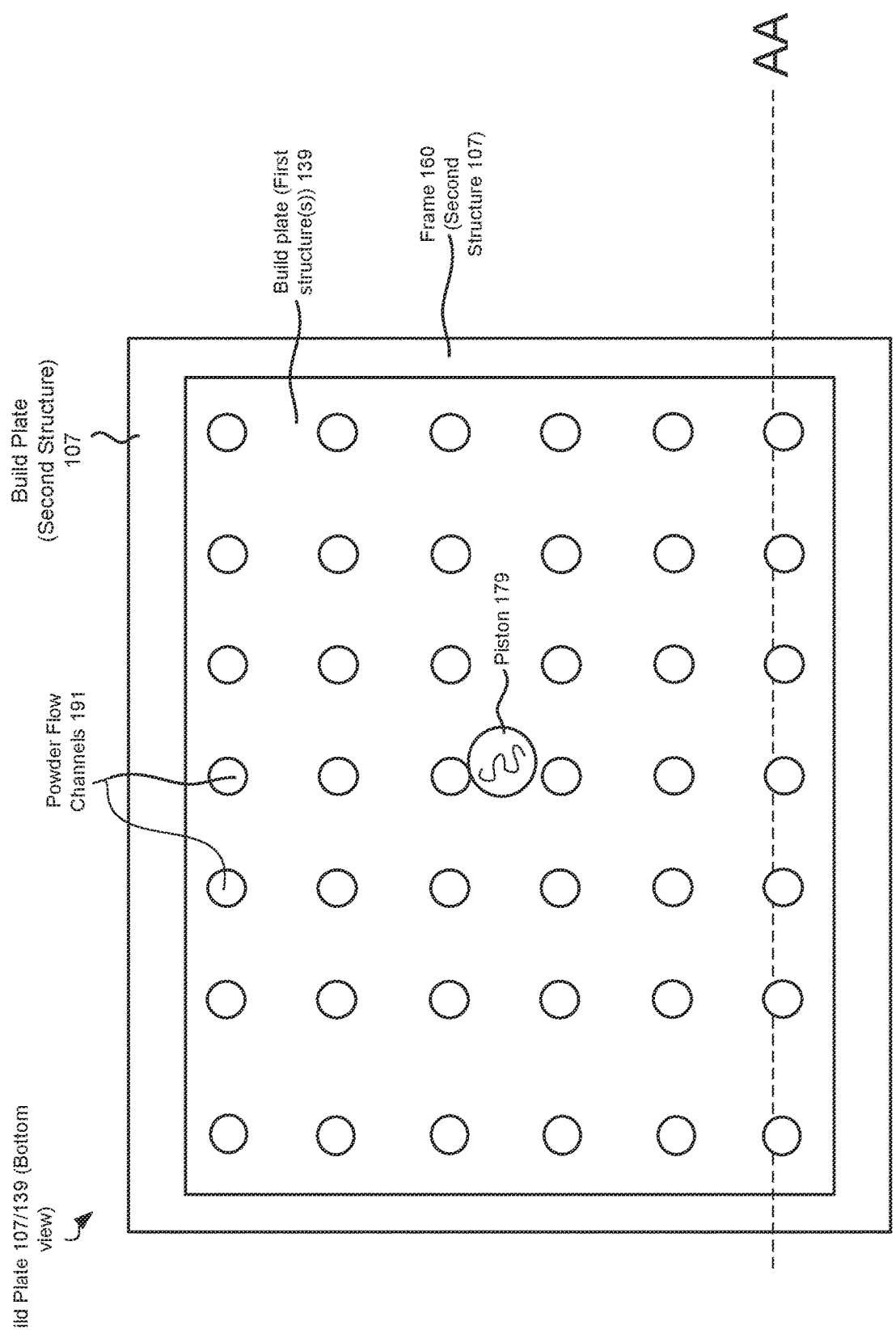
FIG. 1A is a bottom view illustrating an exemplary build plate in accordance with an embodiment.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not necessarily be construed as excluding other possible arrangements or as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure. In many instances, diagrams are shown not to scale in order to highlight and clarify relevant portions of the disclosure.

This disclosure is directed generally to structures and techniques for the rapid removal of unfused powder that remains in the powder bed in a powder bed fusion (PBF) 3-D printer, for example, after rendering one or more build pieces. One of several key benefits of the rapid removal of unfused powder described herein is reduced post-processing times. This disclosure also presents techniques for exposing build piece(s) having powder beds that were recently vacated of unfused powder to a corresponding rapid flow of uniformly cooled (or heated) powder into the powder bed that surrounds the build pieces. The uniformly cooled (or heated) powder can mitigate the adverse effects on the build pieces of temperature fluctuations caused by the heat trapped in the lower powder layers during the fusion process in 3-D printing. The uniformly cooled (or heated) powder can promote a generally constant microstructure of the resulting build pieces. These uniform microstructures help generate printed parts achieve predictable thermal properties and other beneficial properties spanning the entire range of the part, and can help minimize the negative effects on the build pieces caused by temperature variations due to the trapped heat in the unfused powder.

PBF systems are 3-D printers that generally include a build plate on which a powder bed composed of multiple powder layers can be successively deposited. An energy beam source is positioned over the powder bed. The energy beam source may include, for example, a laser, an electron beam source, etc. The energy beam source relies on information compiled from a computer aided design (CAD) model to scan selected cross-sectional regions of successive layers of the powder during a print cycle and to thereby form a resulting structure representing the CAD model.

An entire PBF cycle for rendering a single layer may include a plurality of separate operations. These operations may include a material dispensing procedure, a re-coat cycle, and an exposure (print) cycle. In some configurations, certain of these cycles may overlap or be considered part of the same procedure. The dispensing procedure is a necessary step to feed material or powder to the 3D printer for forming layers. The dispensing procedure involves dispensing material to a container in the printer (e.g., a hopper) that can be used by the printer to form a layer. During the dispensing procedure, a depositor receives the stored powder from the hopper via a powder dispenser, and thereafter, the depositor dispenses the powder onto a build plate. It should be noted that the depositor in this example can itself act as a hopper, since one of its main tasks is to store the received power before dispensing it.

In an ensuing re-coat cycle, a re-coater spreads the powder evenly across a powder bed and/or build plate to form a layer. During the re-coat cycle, as the re-coater traverses the powder bed, a leveler, such as a specially shaped blade or roller, may be coupled to the re-coater. The leveler may be used to spread the deposited powder into a level, evenly-shaped layer across the powder bed.

After the powder layer is deposited, an exposure cycle may occur in which the energy beam, based on instructions from a print controller, selectively scans the powder bed to fuse portions of the deposited layer by forming a weld pool of melted powder in regions identified by the controller. The weld pool quickly solidifies into a portion of the intended cross-section of the build piece being printed. The various print operations (including the dispensing, re-coat and exposure cycles, for example) may continue in succession until the requisite number of layers are deposited and the build piece is complete. Thereafter, the un-fused, loose powder particles and the build piece can be removed from the PBF printer and the build plate can be prepared for another print run.

More than one build piece may be printed during one print job, depending on considerations like the relative sizes of the build pieces and the powder bed. These considerations are largely accounted for in an earlier computer aided design (CAD) process or simulation conducted prior to the print job, wherein a designer renders a three-dimensional computer model or representation of the build piece(s). The CAD designs may be compiled over the course of a few intermediate steps (e.g., support structures may be designed and generated where necessary to support overhanging portions of the build piece during printing, etc.). Ultimately the CAD designs are compiled into a design model with print instructions that are readable by the 3-D printer.

During a print operation, the 3-D printer uses a build plate to support the build piece and the unfused powder that accumulates as the layers are added during the re-coat cycle. A build plate is conventionally a singular, integrated platform (e.g., a flat, planar piece of material) that supports a powder bed receptacle, in conjunction with powder bed receptacle walls. That is, during each cycle, powder is dispensed on the build plate and spread over the build plate as a layer using a re-coater device (e.g., a leveler) to spread the powder. After the re-coat cycle, the print/exposure cycle relies on print instructions from the controller or other processor to manipulate an energy beam source (e.g., a laser, electron beam, etc.) to selectively fuse portions of the layer that correspond to a section of the build piece for that layer, as described above.

The controller can use a compiled design model of the build piece from the CAD operations, and/or other information pertaining to the generation of support structures that may be needed. While not part of the build piece itself, the support structures may be needed to attach from the build piece to portions of the build plate, e.g., in places where the angle formed by the build piece and the build plate exceed 45° (45 degrees).

As noted above, a current shortcoming of powder fed 3-D printers is that, as the controller begins to accumulate layers in the powder bed, the unfused powder tends to trap heat in the powder bed resulting from the fusion process. The effect of the heat is generally worse at regions closer to the build plate, since layers have been added that effectively trap the heat and the effect can be amplified as the layers go lower toward the build plate. The result can be a range of temperatures within the unfused powder that are concurrently affecting the microstructure that forms the build plate.

For example, at a microscopic level, the powder may be composed of a plurality of generally spherically-shaped pieces. Because an arrangement of generally spherical volumes only makes contact at certain small regions where the neighboring spheres are actually touching, the remaining regions not touching tend to trap the high temperatures, making the overall powder a poor conductor of heat. Even if the powder is assumed to be in shapes other than perfect spheres, typically the powder is not making continuous contact with other powder particles, and thus the powder remains a poor conductor. In effect, heat is trapped in the unfused powder and can have a deleterious effect on the build piece as layers are added.

Thus, at the conclusion of the print job, it is generally important to remove the powder as rapidly as possible to terminate these undesirable effects imposed by the trapped heat in the powder. Many conventional implementations separate the build pieces from the unfused powder at the conclusion of the print job by using a vacuum device that is directed at various portions of the build plate. This is a slow and time-consuming manual process, which becomes even slower (and progressively less effective) as the print jobs become more complex and/or use a higher density. Thus, conventionally after the print job, the unfused powder can undesirably linger about adjacent portions of the build piece(s) for an extended period of time before the powder can be removed. This extended time period means that the build piece(s) remain exposed to the undesirable temperature gradients caused by heat trapped in the powder. These temperature gradients can directly affect the microstructure of the build piece in different ways, depending on the temperature of the adjacent powder at a specifically defined region of the build piece. The build piece can, as a result, become structurally compromised by having uneven or poorly formed microstructures that can later loose strength or other properties, malfunction or eventually even break under stress.

In recognition of these problems with conventional powder removal, newer equipment has been marketed that can invert the entire build plate to dump the powder. In other attempted solutions, new equipment can use high velocity or high pressure air to remove the powder. In the former case of inversion of the build plate, one downside can be damage to the various seals between the build cylinder/plate and other associated mechanisms from such handling. The inversion can also adversely affect the build piece itself, as the forces of gravity and the torque caused by the rapid "flip" of the freshly-fused build piece can adversely affect the build piece during the inversion. Conversely, in the latter case of using high velocity or high pressure air, using this solution alone can be equally time-intensive, ineffective especially for more complex designs, and potentially damaging to the build piece being stricken with air at these high velocities or being subject to high pressures immediately after being printed.

Accordingly, in one aspect of the disclosure, the negative effects of the unfused powder are addressed in rapid fashion by the build piece itself. These techniques, described below, preserve the structural integrity of the build piece while rapidly removing the powder (and hence the potentially damaging temperature gradient) from the build chamber. In various embodiments, the build piece includes a first structure and a second structure (each of which may include a plurality of respective first or second structures, depending on the implementation) to enable rapid removal of unfused powder, e.g., after the build piece is printed. These first and second structures provide the build plate with features for allowing the removal of unfused powder from the build chamber by allowing it to drain through the build plate, including immediately on conclusion of the print. The build plate may include a second structure, such as a static grid, having configurable features (e.g., a plurality of first structures) that open and close channels for allowing rapid powder egress. Examples of these rapid powder removal techniques are provided below. Support structures in this case would need to tie only to the second structure—in this embodiment, the static portion of the build plate. During the period of powder removal in some embodiments, the build piece is fused to the second structure by virtue of the energy beam acting on the first few layers at the beginning of the print job. A majority of the cross-sectional area occupied by the build piece will likely contact, and therefore fuse to, the second structure(s). As the build piece is printed over a period of print cycles, the base of the build piece is consequently fused to the second structure(s). While the strength of this fusion may be deliberately marginal, with lower temperatures used and/or less area affected, for example, the fusion of the base of the build piece to the build plate can still be sufficiently strong to enable the second structure(s) to support the build piece during rapid powder removal, but not so strong as to require another process involving heat to separate the two after the print job. This means that during the rapid powder removal process, the second structure(s) can provide sufficient support for the build piece by stabilizing it. The second structure(s) also can support the build piece during the rapid powder egress regardless of whether the build piece is fused to the second structure(s) since the apertures in the second structure are ordinarily made too small for the build piece to pass through. In various embodiments discussed below (see, e.g., FIG. 4 and accompanying text), the powder itself can be used as a means of support for the build piece. During subsequent powder removal, the second structure(s) prevent the build piece from falling through the build plate at least because the first structure(s)

used to pass the powder through holes in the second structure(s) are generally too small for the build piece to impenetrate.

One of several benefits of this feature is an improvement in post-processing times for additively manufactured parts, which is generally beneficially to industries that rely on AM powder bed technologies. Improved post-processing rates can be very important where the materials used are sensitive to residual stress driven cracking such as, for example, laser-based powder bed fusion titanium allows.

A second benefit of the disclosed technology is the ability of a PBF system to exchange the unconsolidated powder volume surrounding the part. As noted, for certain materials this powder is highly insulating due to poor conduction between the individual powder particles. This in effect can result in temperature build-up within the build chamber over the print duration, which in turn can result in undesirable microstructure variation at the top of the build piece versus the bottom. Exchanging powder can mitigate this temperature variation. Therefore, in various embodiments, the powder is exchanged during, rather than only after, a print job. Older heated powder can be routed outside the build chamber and separated from the build chamber via an insulation layer. Meanwhile, new, cooled powder can be dispensed from a new hopper and provided to surround the build piece. The cooled powder can help the build piece maintain a substantially uniform microstructure. In various embodiments, a new batch of powder that is loaded into the build chamber for surrounding the build piece(s) can also be pre-cooled to a desired temperature such as by a cryogenic process. Combination of this process with ultrasonic vibrations (e.g., from one or more ultrasonic transducers arranged in the PBF system) can be used to cause movement of the new powder supply and encourage the new powder to settle in place quickly after the exchange. After cooling the build piece to a desired uniform microstructure temperature, the powder can be ejected and replaced, or further printing can occur and additional layers added onto the existing powder.

In addition, rapid powder removal/exchange according to the embodiments described herein can be used to expose the build piece(s) or some portion thereof to enable direct cooling such as by convection, which would otherwise be precluded by the surrounding powder. Rapid powder removal or exchange, whether during the print job or at the termination of the print job, can facilitate in situ heat treatment of build pieces as both heated or cooled gasses can theoretically be introduced into the build chamber depending on the types of materials used and the design objectives for the build piece.

In various embodiments, rapid powder removal can be done before the build is complete (e.g., in the middle of the build) if a defect is detected in the build piece. Removal of the powder may expose the defect so that it may be fixed, e.g., with a welding device that remelts the area of the defect. Once the defect is corrected, powder can be deposited back onto the build plate up to the correct level to resume printing.

FIG. 1A is a bottom view illustrating an exemplary build plate in accordance with an embodiment. The build plate can be used in connection with a 3-D printer, such as the PBF system 100 shown in FIG. 1C. Referring to FIG. 1A, the bottom view of the build plate is a view looking up from the floor at the underside of the build plate. The bottom view of FIG. 1A shows a line AA, which is used in a subsequent illustration to provide a sectional view of the build plate. As shown, the bottom view of the build plate includes a first structure 139 and a second structure 107. Frame 160 can be seen surrounding the build plate as part of the second structure 107, but frame 160 need not be limited to the exterior portion of the build plate. Instead, frame 160 can be the portion of the build plate that holds the second structure 107 together as one piece. However, in the view of FIG. 1A, only limited portions of the second structure 107 are visible.

Shown further in FIG. 1A is a cross-sectional view of a piston 170, which is attached in these embodiments to a first structure 139 of the build piece. Piston 170, which is located in a cavity region beneath the build chamber, is attached to the first structure 139. In various embodiments, a plurality of pistons or other connective devices may be separately connected to a respective plurality of first structures. In this embodiment, first structure 139 includes a single structure that can be manipulated by piston 179 as further shown below.

FIG. 1A further shows a plurality of powder flow channels 191, which can be used to effect rapid powder removal when the first and second structures are separated. In other embodiments (e.g., FIG. 5-6), a plurality of first structures may instead be fitted within respective apertures of a second structure to form a build plate. In some examples, the first structures are rotatably coupled to the second structure via edges of the apertures. Rapid powder flow in those embodiments can be achieved by removing (e.g., rotating and lowering) the first structures from the apertures of the second structure(s).

Figure 1B:
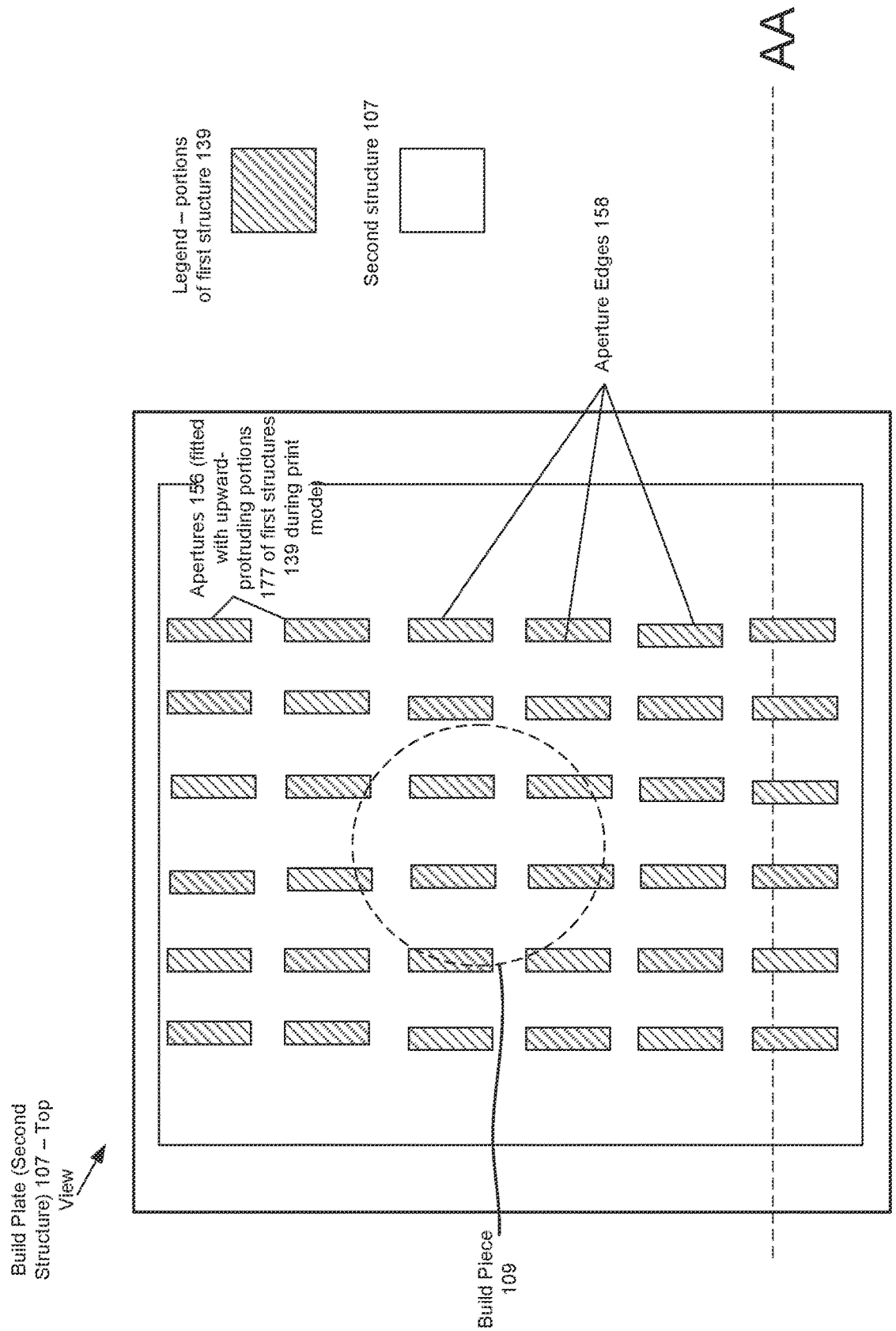
FIG. 1B is a top view illustrating the build plate of FIG. 1A in accordance with an embodiment.

FIG. 1B is a top view illustrating the build plate of FIG. 1A in accordance with an embodiment. The view in FIG. 1B is of the same collection of structures as FIG. 1A, except that FIG. 1B is viewed from directly above the build plate. As shown by the legend on the right, the build plate in this embodiment also uses first and second structures 139 and 107. The second structure 107, which is widely viewable in this figure, includes an array of apertures 156. The edges 158 of apertures 156 are fitted with upward-protruding portions 177 of the first structures 139 to form a solid, flat build plate for supporting both the build plate and the unfused powder during printing. A cross-section of a build piece 109 is also shown resting on the build plate. Notably, build piece 109 is supported by the fixed regions of second structure 107, such that when the upward protruding portions of the first structures 139 in apertures 156 are vacated using piston 139 (FIG. 1A) and the apertures 156 effectively form powder holes for rapidly vacating powder, build piece remains firmly in place, supported by the fixed regions of second structure 107 beneath it.

While FIGS. 1A and 1B show a single first structure that is manufactured with upward protrusions that extend into the array of apertures 156 build into a single second structure 107, in other embodiments the first structure and/or the second structure may be a plurality of separate structures. For example, in one embodiment, one first structure 139 may be associated with one aperture, such that each of the first structures 139 may be connected (e.g., by a common cross-bar array under the build plate) or alternatively, each of the first structures 139 may be structurally distinct, and individually controlled by a separate connector (see, e.g., FIG. 3). It will be appreciated, in short, that the rapid powder removal mechanism may be accomplished using a second structure (or plurality thereof) for supporting the build piece(s), and a first structure (or plurality thereof) for supporting the powder layers along with the second structure during printing, and then subsequently for exposing apertures out of which powder can flow. Stated differently, a number of different geometries of the first and second structures can be used to accomplish the rapid powder removal technique as described in this disclosure.

Figure 1C:
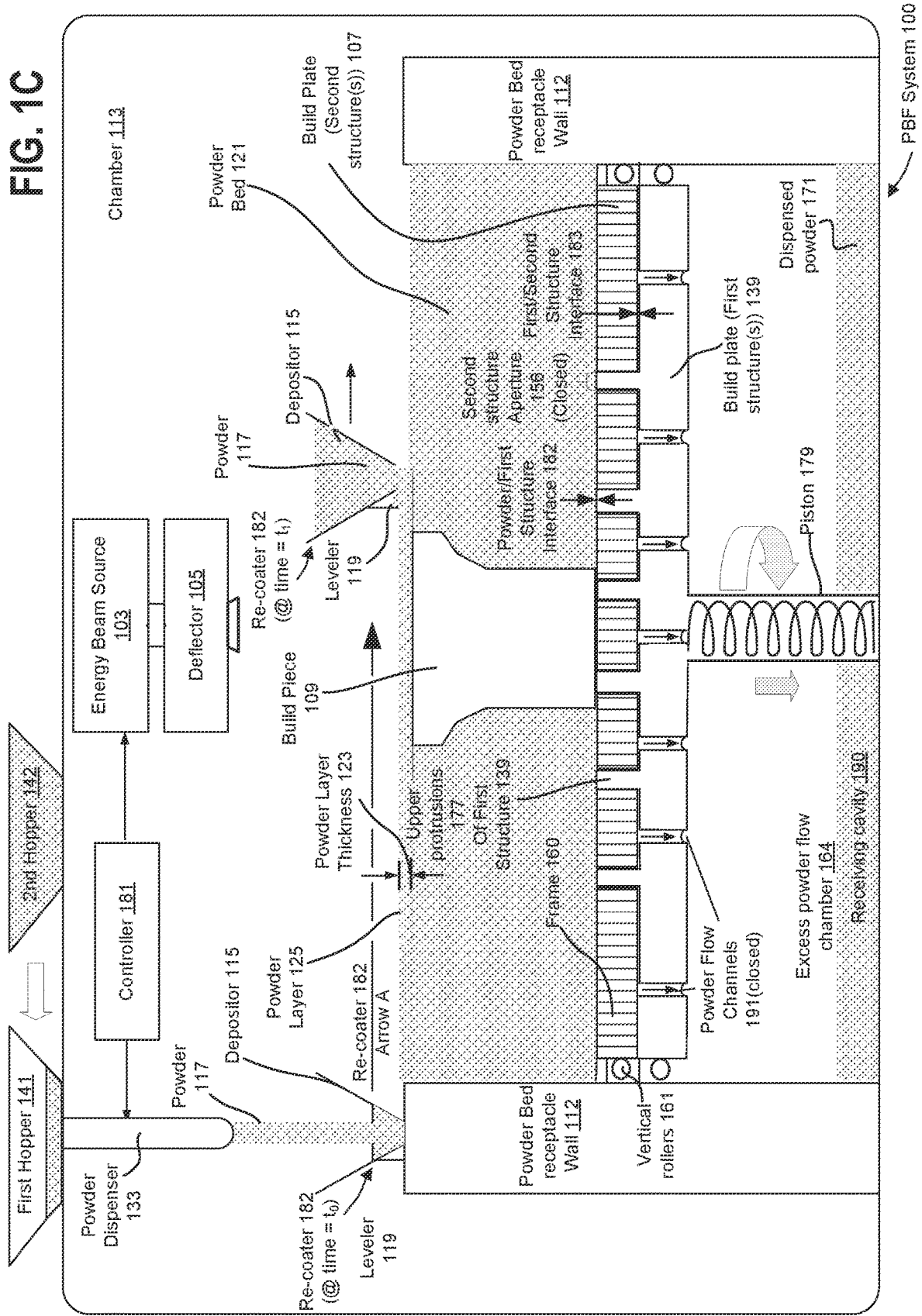
FIG. 1C is a front sectional view of a 3-D printer illustrating exemplary powder dispensing procedures (e.g., @ time $t=t_0$) and re-coating procedures (e.g., @ time $t=t_1$) and illustrating the build plate taken along line AA of FIGS. 1A-B in accordance with an embodiment.

FIG. 1C is a front sectional view of a 3-D printer illustrating exemplary powder dispensing and re-coating procedures and illustrating the build plate taken along line AA of FIGS. 1A-B in accordance with an embodiment. In particular, in the example of FIG. 1C, the 3-D printer is a PBF system and the build plate uses a first structure 139 and a second structure 107 as shown in FIGS. 1A and 1B.

In the embodiment shown, powder bed receptacle wall 112 is intended to encompass and provide sidewall support for the entire powder bed 121. For simplicity, however, a front portion of powder bed receptacle wall 112 is omitted to display the powder bed 121. FIG. 1C shows the dispensing and the re-coat cycle in one figure. Re-coater 182 is first shown at a time $t=t_0$ underneath powder dispenser 133 and above a left side of powder bed receptacle wall 112. A hopper 141 provides powder 117 via the powder dispenser 133 to a depositor 115. The depositor is arranged with re-coater 182 and moves along a surface of the powder bed during a subsequent re-coat cycle. During the dispensing cycle, depositor 115 is filled with at least enough powder 117 to provide one layer to the powder bed 121, and typically includes a surplus to account for a layer that may require additional powder. Re-coater 182 further includes a leveler 119, which may be a specially-shaped blade or roller for spreading the powder evenly during the re-coat cycle.

After the depositor 115 is filled with powder 117 during the dispensing procedure, the re-coater 182 including at least the depositor 115 and leveler 119 moves across the powder bed 121 in the direction of the "Arrow A", and the re-coater 182 uses leveler 119 to spread a layer of powder. In this figure it is assumed that build piece 109 is being printed, and an additional powder layer 125 having a thickness 123 (scale exaggerated for clarity) is formed over the earlier-deposited layers.

Figure 1D:
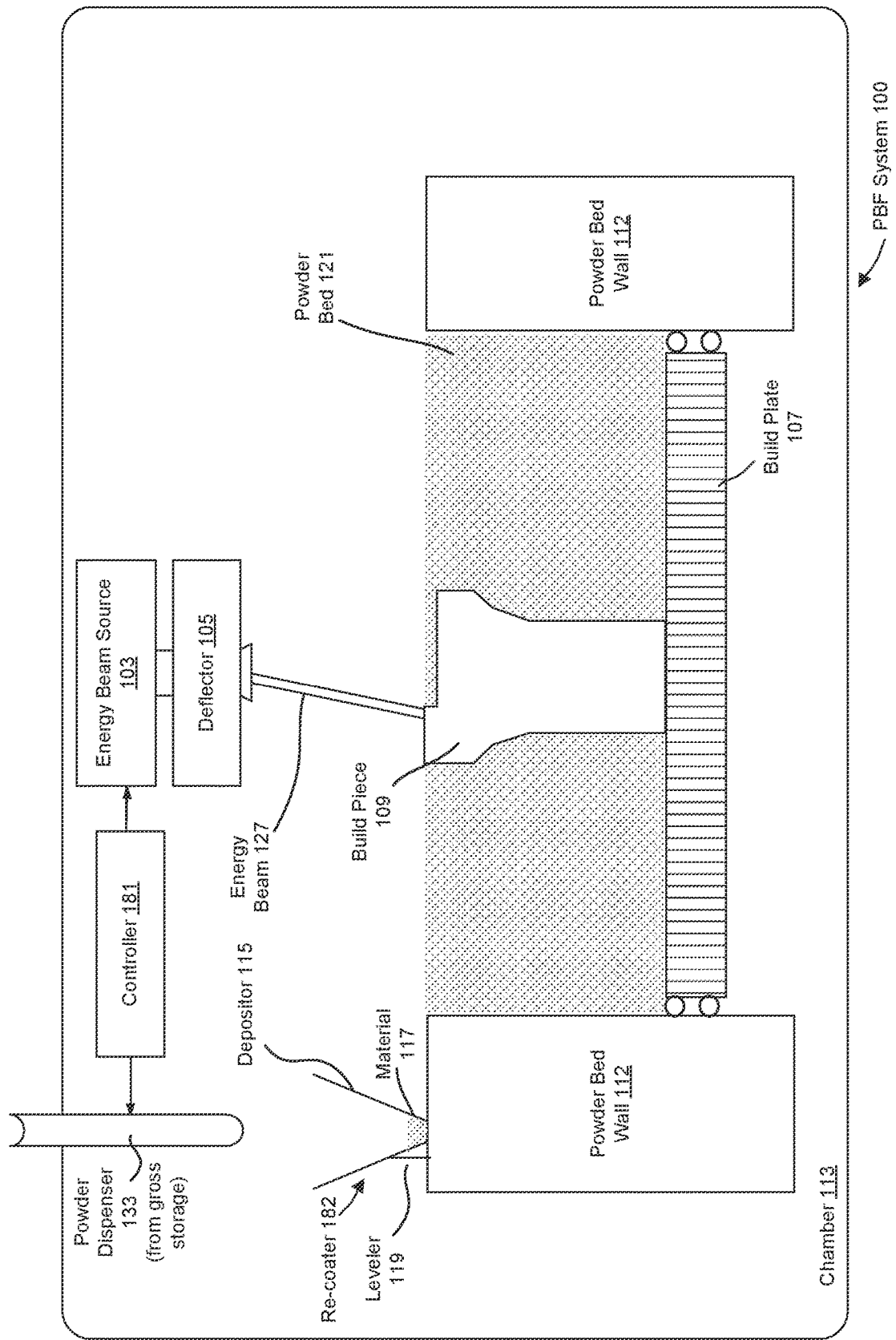
FIG. 1D is a front sectional view of a 3-D printer selectively fusing a layer of a build piece in accordance with an embodiment.

The re-coater 182 is also shown at a subsequent time $t_1$—namely, subsequent to the dispensing procedure. During time $t_1$, the re-coater 182 may continue to use leveler 119 to evenly spread the powder layer until it reaches the right side of powder bed 121, after which the re-coater 182 may return to the starting point under the powder dispenser 133, or it may stay on the far right of the powder bed 121. In either case, the powder bed is cleared for the subsequent print cycle (FIG. 1D).

FIG. 1C further shows a second hopper 142 filled with powder and positioned adjacent first hopper 141. The powder in second hopper 142 can be used in a powder swap, e.g., at a point where it is desired to replace the used powder 117 in powder bed 121 with fresh or new powder. In various embodiments, the second hopper 142 is insulated, or otherwise cooled or heated to a specified temperature for optimal use in the powder swap. The powder swap can be initiated and controlled manually, or automatedly via a command from controller 181 or an external device networked to the PBF device 100. In various embodiments, controller 181 acts a print controller for providing instructions to the 3-D printer to fuse or print specific parts with designated geometries, and to govern the dispensing and re-coat cycles, etc. In some embodiments, controller 181 may include one or more CPUs, dedicated hardware such as digital signal processors (DSPs) or field programmable gate arrays (FPGAs), and other dedicated digital and analog circuits. Controller 181 may further include memory, which may be cache memory or other storage. The memory may be read only memory, random access memory (RAM), static or dynamic RAM, flash memory, or any other appropriate storage unit or device. In various embodiments, the functions of controller 181 may be provided by an external device networked or otherwise coupled to PBF system 100. Controller 181 may be in a central location, or in some embodiment, controller 181 may be a distributed controller with different locations in PBF system 100, e.g., where the locations are relevant to the functions being performed at that location. In various embodiments, additional or different controllers may be used. Controller 181 may be used to manipulate the first structure(s) 139 and second structure(s) 107 of the build plate. In other embodiments, a separate controller or an external device may control the build plate, whether in a powder swap during a 3-D print or in a rapid powder removal procedure following the print. In various embodiments, controller 181 may control the energy beam source 103 and deflector 105 during the print cycle (FIG. 1D).

As shown in FIG. 1C, the build plate includes a frame 160 which is ordinarily part of the second structure 107 and which in this embodiment connects the second structure 107 together. The structures having the repeating vertical line pattern represent portions of the frame 160 of the second structure. While the portions of the frame do not look integrated together in FIG. 1C, it should be clarified that the view of the build plate is a cross section taken from line AA of FIGS. 1A and 1B. Thus, the frame 160 is actually part of a single second structure 107 in this embodiment.

The lower portion of the build plate includes first structure 139. First structure includes protrusions 177 that extend upward into the apertures 156 arranged in the second structure 107 of the build plate, as was shown in FIG. 1B. In this configuration, the apertures 156 are closed in that they are filled by the protrusions 177 of the first structure, and the build plate is acting as a support plate for the powder bed 121 as per usual operation. FIG. 1C also shows the interface 182 of the powder at the bottom of the build plate where the powder meets one of the upper protrusions 177. FIG. 1C also shows the interface 183 between the first and second structures. During the print cycle (FIG. 1D), these interfaces remain snugly secure and the upper protrusions 177 keep the apertures 156 closed unless and until a powder swap command is issued by controller 181 or by another appropriate mechanism.

FIG. 1C also shows a cross-sectional representation of the powder flow channels 191, which can also be seen in FIG. 1A. In FIG. 1C, the powder flow channels 191 are shown as closed because an upper end of the channels is blocked by second structure 107. However, as described below (FIG. 1D), the piston 179 can move the first structure downward (and in some embodiments, piston 179 can rotate) to open the powder flow channels and the apertures 156 such that powder can be rapidly removed into an excess powder flow chamber 164, which may also be referred to as a receiving cavity 190. The excess powder flow chamber 164 or receiving cavity 190 can store the dispensed powder 171, for example. During a powder reswap, while receiving cavity 190 captures the falling powder, the second hopper 142 may be aligned to dispense uniformly cooled (or heated) new powder via the powder dispenser. In various embodiments, large amounts of powder can be ejected at once from the powder dispenser 133 and used to fill the powder bed 121 rapidly for providing new powder around a build piece without having to perform a separate re-coat for each layer.

At the end of a print job, it may be desirable to rapidly remove the powder in the powder bed, as described herein. Thus, while the piston 179 operates to move the second structure such that the powder can fall into the receiving cavity 190, the second structure 107 can continue to support the build piece 109 to prevent the build piece from falling through the apertures 156. The size of the build piece 109 should as a result be designed to be comparatively larger than the apertures 156 in the second structure 139 to ensure that the apertures are small enough to prevent the build piece(s) from moving during the powder removal.

FIG. 1D is a front sectional view of a 3-D printer selectively fusing a layer of a build piece in accordance with an embodiment. That is, FIG. 1D shows the print cycle that follows the powder dispensing and re-coat cycles shown in FIG. 1C. Re-coater 182 and the depositor 115 are shown as re-positioned on the left side of the PBF system 100 to avoid interference with the print cycle. During the print cycle, the energy beam source 103 may receive instructions from controller 181 to selectively melt the powder in the top layer. The melted powder cools and solidifies. In the example shown, the energy beam source provides an energy beam 127 to a deflector 105. Where the energy beam 127 is a laser, the deflector 105 may be used to direct the energy beam 127 onto a desired part of the powder bed to fuse the correct portions of the layer.

In FIG. 1D, only the frame of build plate 107 is visible, since the build plate 107 is acting as one uniform support plate during the print cycle. In addition to the separation of the first and second structures during a rapid powder removal, build plate 107 can also be instructed to move down in an amount equal to a layer for each print cycle in order to keep the energy beam source 103 at a generally constant distance from the surface of the powder bed 121.

After the fusing is complete, the energy beam source 103 may switch to an "off" or an "idle" position, and the depleted depositor 115 is then in a position to receive an additional dose of powder from hopper 141 in a next dispensing cycle and in preparation for a subsequent re-coat cycle.

Figure 1E:
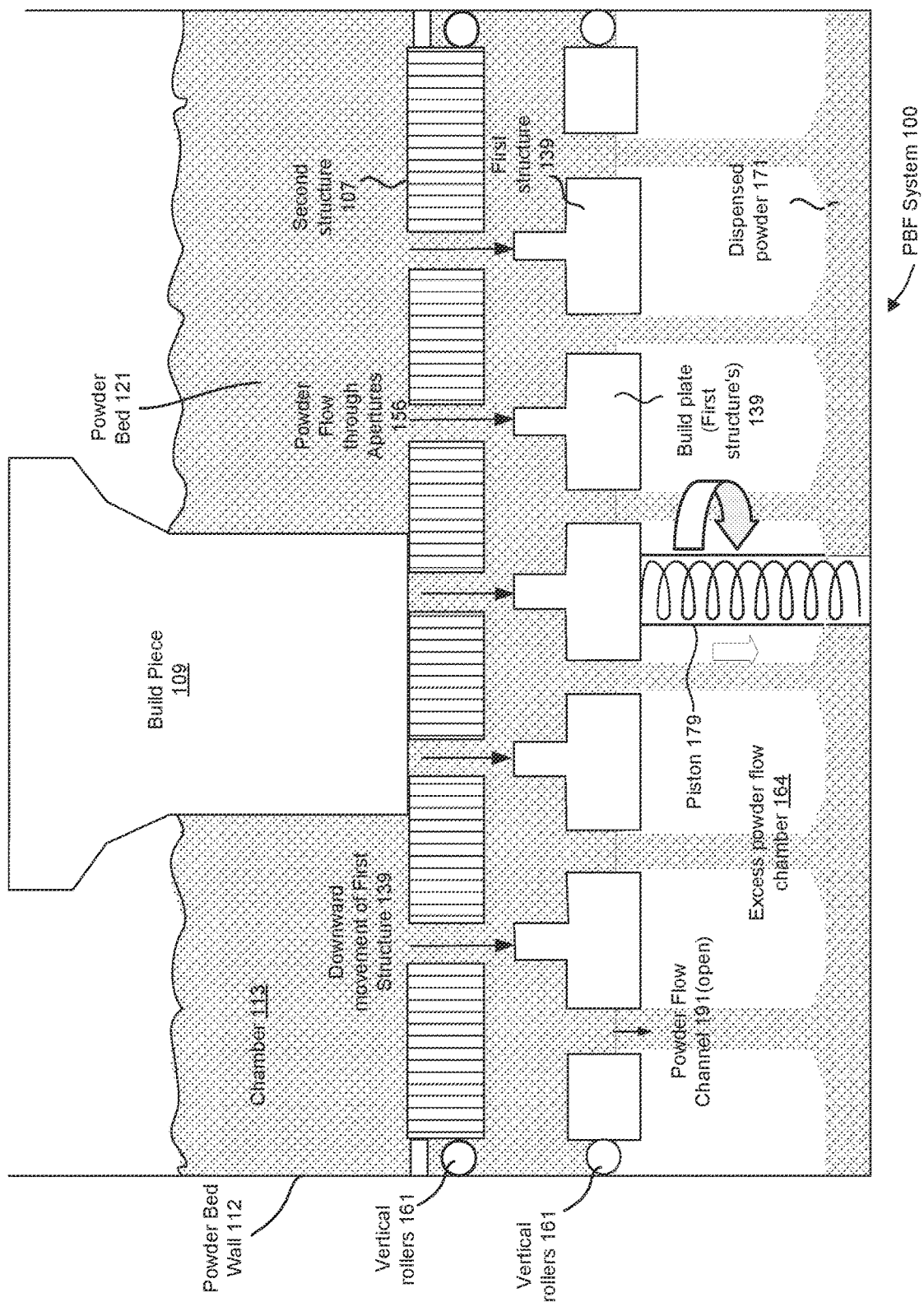
FIG. 1E is a front sectional view of a 3-D printer including a build plate having a first structure that moves downward relative to a second structure for allowing the rapid removal of powder from the print chamber while the second structure maintains support for the build piece, in accordance with various embodiments.

FIG. 1E is a front sectional view of a 3-D printer including a build plate having a first structure that moves downward relative to a second structure for allowing the rapid removal of powder from the print chamber while the second structure maintains support for the build piece, in accordance with various embodiments. For example, in the embodiment shown in FIG. 1E, the PBF system 100 may have completed the print job. In order to rapidly remove the powder from the powder bed 121 and avoid excessive exposure of the build piece to the undesirable thermal gradients produced by the powder's trapped heat, the piston 179 may quickly lower the first structure 139, e.g., with the assistance of the vertical rollers 161. The downward and circular arrows displayed adjacent piston 179 show that the piston 179 can flexibly move the first structure 139 both downward and in a rotating direction (if necessary) to facilitate the powder flow. FIG. 1E shows the rapid powder flow through apertures 156 of the second structure and through the powder flow channels 191 of the first structure (which are now open by virtue of the first and second structures separating) and ultimately into the excess powder flow chamber 164. The dispensed powder 171 is shown as building up at the bottom of excess powder flow chamber 164. In other embodiments, the falling powder is directly routed to another storage device that is removable from the PBF system 100. During this time, build piece 109 remains stable on the second structure 107.

After the chamber 113 is depleted of powder in FIG. 1E, the build piece 109 can, after any unrelated post-processing steps, be expediently removed from the PBF system 100. The first and second structures can thereafter recombine and close in preparation for a new print job. In some embodiments, one or more ultrasonic transducers can be used to further drive small powder particles off of ledges, etc. of one of the first or second structures to ensure that all power is removed from the build plate and that the build plates are clean and ready to recombine.

Figure 2:
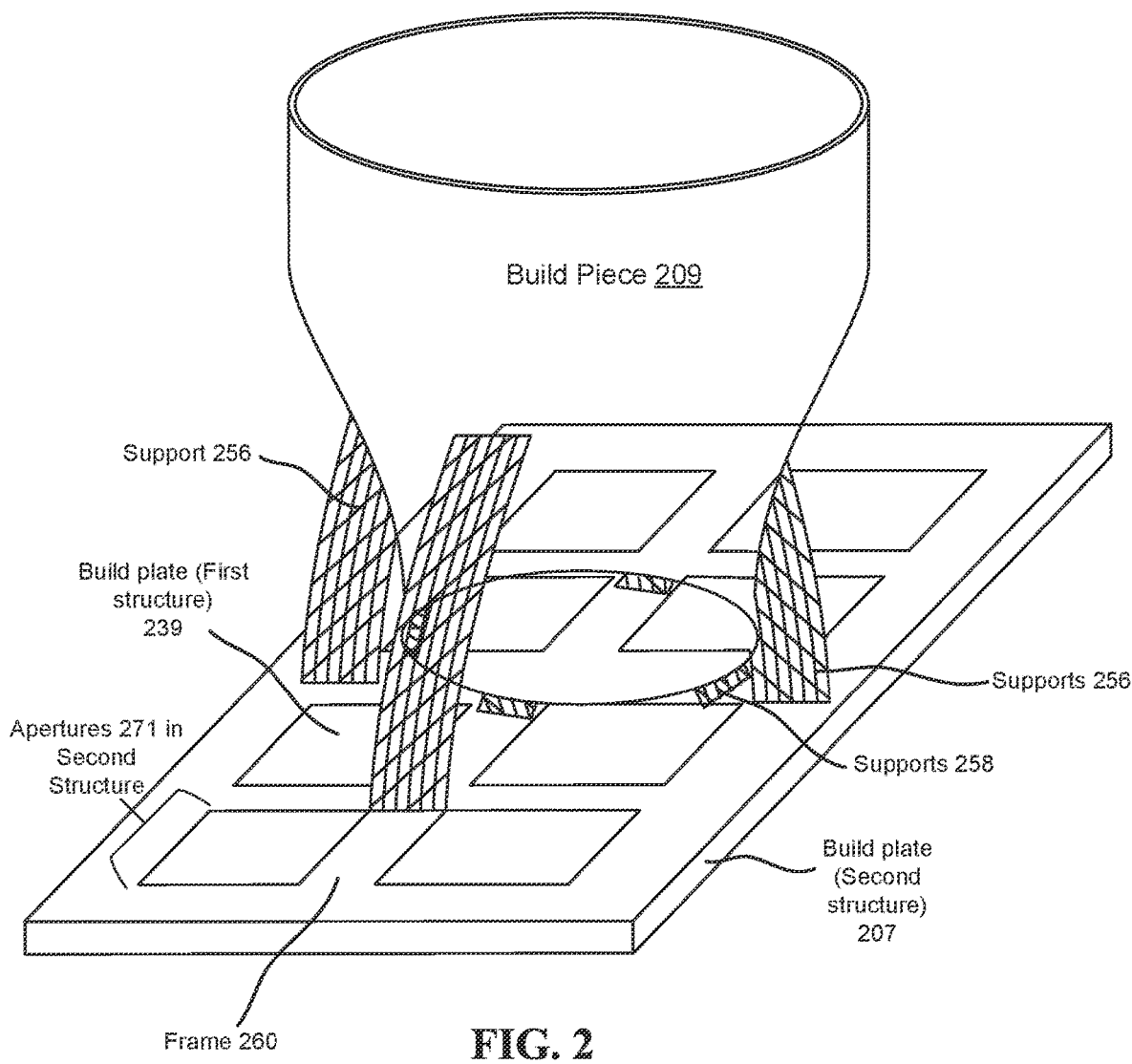
FIG. 2 is a perspective view of an exemplary build plate including a build piece supported on the build plate by support structures that extend from a frame of the build plate and connected to the build piece, in accordance with various embodiments.

FIG. 2 is a perspective view of an exemplary build plate including a build piece supported on the build plate by support structures that extend from a frame of the build plate to the build piece, in accordance with various embodiments. In various embodiments, support structures may be needed to support excess angles that portions of the build piece 209 may make with the build plate (e.g., more than 45 degrees). Portions of build piece 209 are shown as transparent in the figure in order to allow a better view of the build plate. The support structures can be fabricated in a step prior to the actual print. In some embodiments, the support structures themselves may be 3-D printed; in other embodiments, the support structures may be manually made or machined, or provided as commercial off the shelf (COTS) parts that have been cut, bent or cured as appropriate, and manually or automatedly inserted into the powder bed, in some cases using adhesives.

FIG. 2 shows a build plate which also includes a second structure 207. The second structure 207 is defined by a frame 260 that includes eight rectangular apertures 271. The build plate further includes a plurality of first structures 239 that are designed to fit into respective apertures 271 and snugly support the combination of build piece, support structures, and loose powder during a print job. The build piece 209 in this embodiment includes four support structures 256 for supporting a middle portion of the build piece 209, and four additional support structures 258 for supporting a posterior of the build piece 209. In this embodiment, the second structure is configured to remain immobile relative to the build piece 209. Accordingly, it is important in this embodiment that the support structures are connected to the second structure 207, and not the first structures 239, of the build plate. This is because, during rapid powder removal at the end of a print job or powder exchange, the second structures 239 are configured to lower (and in some embodiments, bend or rotate) to enable channels to provide essentially unimpeded powder flow out of the build chamber. After the rapid powder removal, technicians or automated constructors (e.g., robots) can simply remove the support structures 256, 258 and the build piece 209 from the chamber for future use.

In FIG. 2, it should be noted that first structures 239 may use distinct embodiments from those used in FIGS. 1C and 1D, for example. In various embodiments, each of the first structures 239 may each be separately connected to a member that is individually configured to move the single first structure 239 to which the member is connected, with other individual members being similarly configured to move the other individual first structures 239 independently from one another using distinct connections. In other embodiments, the first structures 239 may be coupled together, e.g., via an array of crossbars underneath the build plate, such that all the first structures can move in and out of the second structure 207 at one time as needed for rapid powder removal. In other configurations, the first structures may rely on gravity or may be suspended using special springs or other devices to facilitate their separation from the second structure 207. In short, a number of different embodiments may be contemplated for segregating components of a 3-D printed build plate to effect the rapid powder removal and/or powder exchange described herein.

Figure 3:
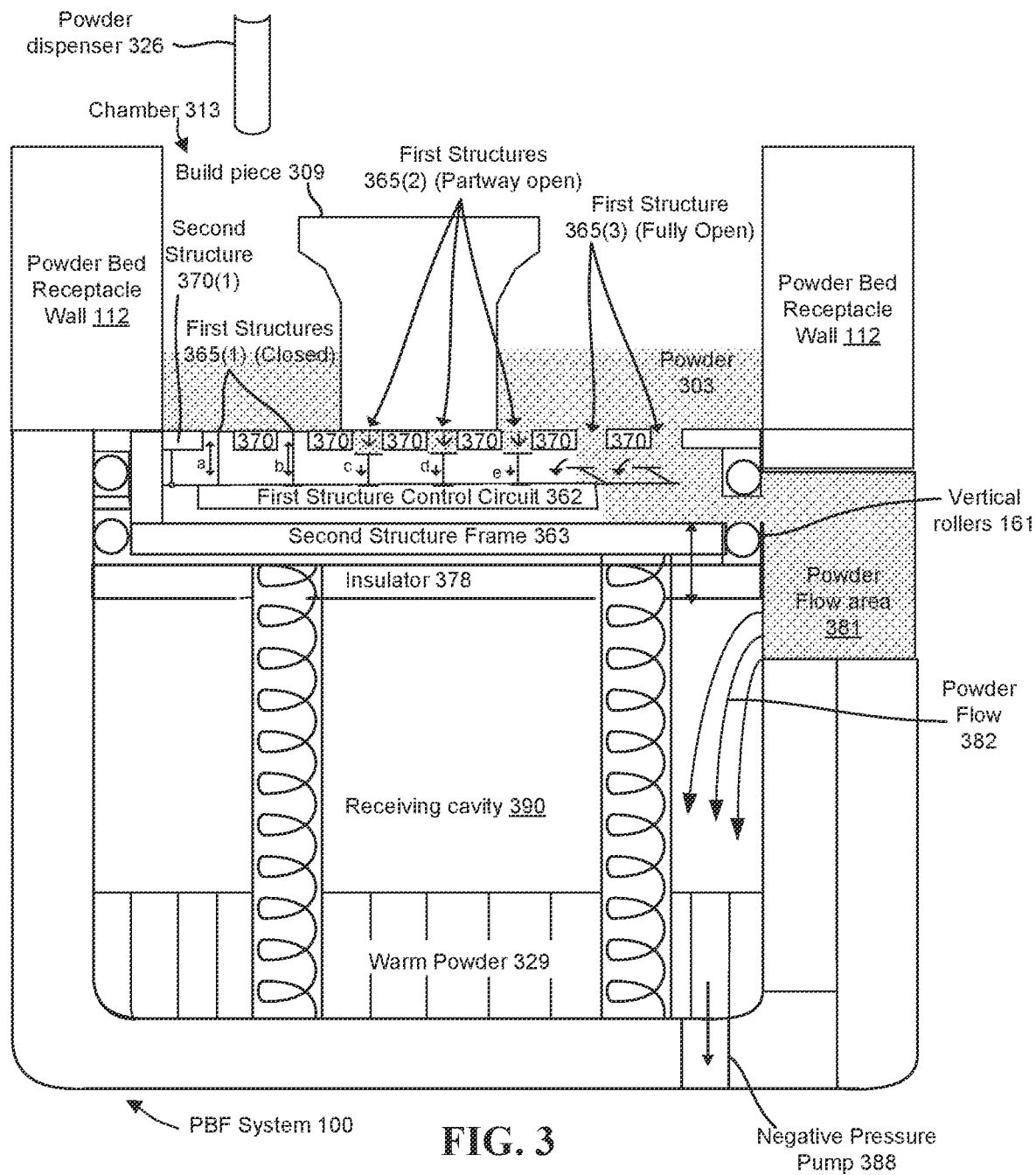
FIG. 3 is a front sectional view of portions of a 3-D printer including a build plate showing a first structure thereof in exemplary closed, partway open, and fully open configurations, and powder flowing into an insulated receiving cavity.

FIG. 3 is a front sectional view of portions of a 3-D printer including a build plate showing a first structure thereof in closed, partway open, and fully open configurations, and powder flowing into an insulated receiving cavity. FIG. 3 shows different configurations for convenience and simplicity. However, in various embodiments, all of the first structures may open and close at once in order to provide a uniform removal of powder.

FIG. 3 shows a PBF system 100 in accordance with another embodiment. PBF system 100 includes a chamber 313 defined by a build plate (the build plate having first structures 365, including 365(1), 365(2) and 365(3), and second structures 370(1) and 370), and powder bed receptacle walls 112). For illustrative purposes, the 3-D printer is at the end of the print job and is undergoing powder removal. A powder bed originally filled with powder 303 is being drained through the build plate. The powder flow 382 continues into a separate receiving cavity 390 that is at least partly thermally insulated from the chamber 313 by insulator 378. With the presence of insulator 378, the deleterious effects of the heat trapped in the powder of the receiving cavity 390 and flowing into the chamber 313 are mitigated. In some embodiments wherein a powder exchange is occurring in the middle of a print job, the insulator can also keep new cool powder that enters the chamber 313 from powder dispenser 326 insulated from the warm powder 329 that has entered receiving cavity 390. FIG. 3 also includes vertical rollers 161 that serve to facilitate lowering the build plate in a layer-by-layer fashion during print operation, and segregating the first and second structures from each other during a power removal operation.

FIG. 3 also shows a sectional view of another exemplary embodiment of the build plate. Referring to the left side of the build plate of FIG. 3, second structure 370(1) is shown on the far left of the build plate. A number of identical second structures 370 are positioned to the right of second structure 370(1). In some embodiments, second structure 370(1) and the remaining second structures 370 are all part of the same structure (but they are connected out of the plane of the sectional view of FIG. 3). In other embodiments, the second structures are independently controlled.

Between each of these second structures 370 is an aperture, which may be either closed, partway open, or fully open. For example, immediately to the right of second structure 370(1) is an aperture in which first structure 365(1) is in a closed position. First structure 365(1) includes a horizontal member and a vertical member. The horizontal member fills the aperture between second structure 370(1) and the second structure 370 to the right of second structure 370(1). The vertical member of first structure 365(1) is adjacent a bi-directional arrow labelled "a". The arrow "a" is intended to mean that the vertical segment of the first structure 365 can be moved downward to open the aperture between associated second structures 370(1) and 370, or alternatively, the vertical segment can be moved upward to close the aperture, as the aperture is currently shown.

FIG. 3 also shows another closed first structure 365(1) that likewise has a horizontal member closing the aperture and a vertical member adjacent the bidirectional arrow "b". The arrow "b" has the same meaning as "a".

The next three first structures 365(2), having respective vertical members defined by unidirectional arrows "c", "d", and "e", are partway open. Each of arrows "c", "d", and "e" adjacent the first structures 365(2) demonstrate that the first structures 365(2) are all opening, and powder 303 is beginning to flow through the adjacent second structures, but that second structures 365(2) are not fully opened.

The remaining two first structures 365(3) are fully open. As shown by the two arrows, the first structures 365(3) have been moved downward (as in the partway open first structures 365(2), but in addition, the first structures have also been fully rotated to the right. As a consequence the first structures 365(3) are fully open and powder 303 is flowing unhindered through those apertures into powder flow area 381 and then into receiving cavity via powder flow 382.

The different modes of the build plate of FIG. 3 (closed, partway open, and fully open) were shown primarily for illustrative purposes to demonstrate an example of how the control circuit 362 may open and close the various structures in preparation for powder removal or exchange. In some embodiments, however, it may be beneficial to open some while keeping others closed (e.g., to avoid an avalanche of powder from all dispersing at once, if necessary). However, aside from these types of examples, it should be noted that in various embodiments, first structures 365(1), (2) and (3) can open and shut simultaneously, depending on whether a powder removal or exchange procedure is underway. If a regular print job is occurring, the first and second structures 365, 370 all form a single integrated build plate. When a rapid powder removal occurs after a print job, build piece 309 remains supported and held in place by second structures 370 while all of the first structures can fully open, and the powder 303 can then pour through the newly vacated apertures at a maximum rate to accomplish powder removal as quickly as possible.

In some embodiments, a vacuum, or a negative pressure, pump 388 is provided for removing the warm powder from the receiving cavity 390. This process can occur concurrently with the next print job, and therefore does not reduce post-processing times.

Figure 4:
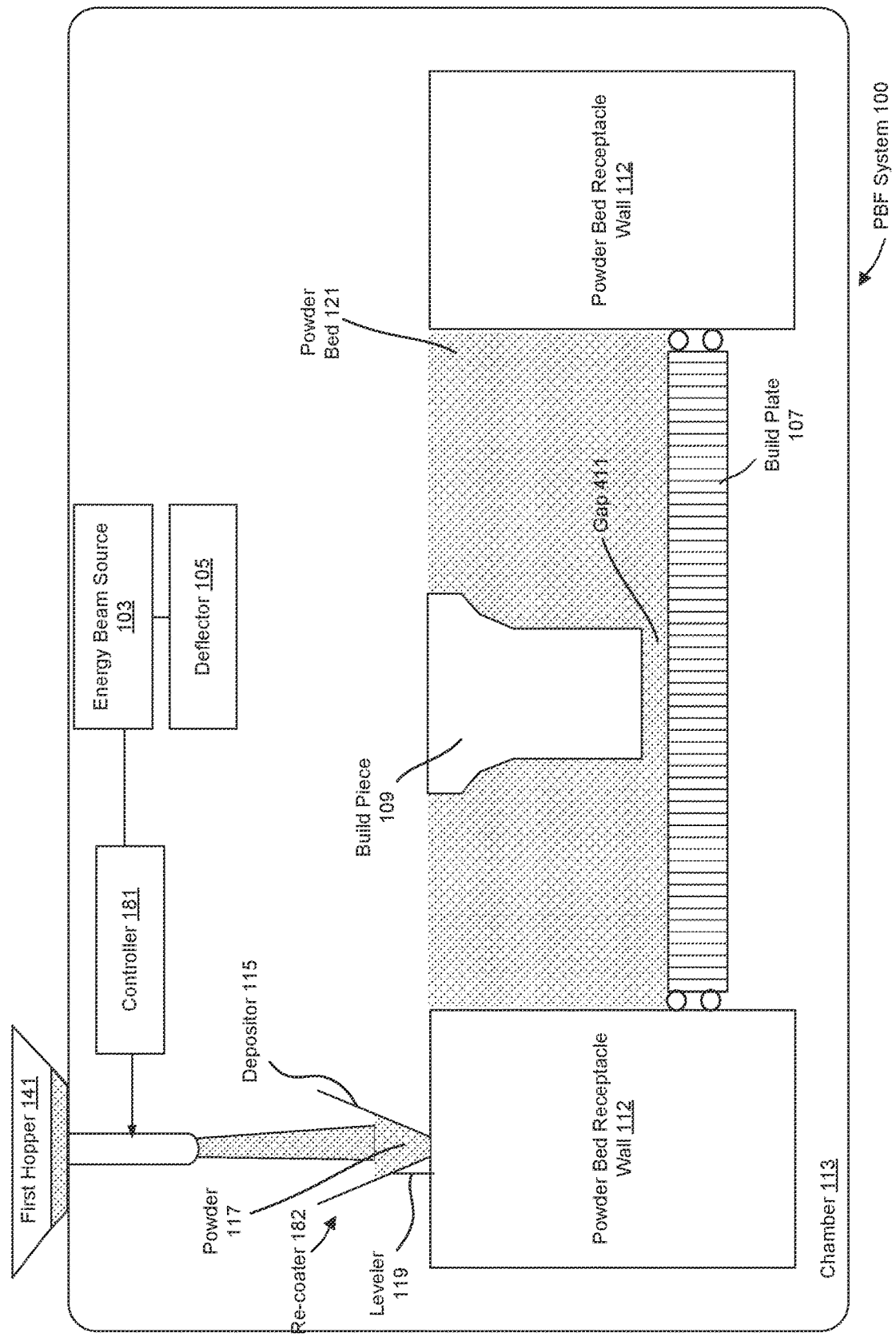
FIG. 4 is front sectional view of an exemplary 3-D printer in which the build piece is supported by the powder, in accordance with an embodiment.

FIG. 4 is front sectional view of an exemplary 3-D printer in which the build piece is supported by the powder itself, in accordance with an embodiment. The PBF system 100 is shown without the energy source and various other components for simplicity. In the embodiment of FIG. 4, the build piece is constructed so as to enable the supporting material itself to stabilize it. Thus, for example, a powder-filled gap 411 may exist below the build piece 109. The powder may be densely packed in anticipation of this scenario. In some embodiments, the viscosity or other parameters of the print material may be adjusted such that the build piece 109 can be adequately supported by the material. For example, if the powder is thick and heavy, it may provide a sufficient base for an energy source to fuse the powder into a structure (e.g., build piece 109) that is over a gap 411 of the same supporting powder. The structure may then be built within the powder bed, using the powder as a support rather than the build plate per se. Various similar embodiments of this configuration may exist such as, for example, where a small portion of build piece 109 is in contact with the build plate 109, the latter of which may otherwise be supported by the powder.

In the embodiment of FIG. 4, rapid powder removal would mean that the powder may flow through first structures (omitted for clarity) that were removed from apertures in the second structure(s) to enable rapid powder removal, as before. In these embodiments, however, the second structure (s) may also act as a safeguard for preventing build piece 109 from breaching the build plate, for the same or similar reasons as in earlier embodiments. For instance, the second structure(s) may be a primary structure that is substantially larger than the first structure(s). Thus, build piece 109 can be protected from falling with the rest of the powder. In other embodiments where a powder exchange takes place, a second phase may occur after the powder removal in which first structures are reconnected to the second structure and a hopper that is heated (or cooled, depending on the desired properties of the build piece 109) may rapidly dispense powder directly into the powder bed in chamber 113.

Figure 5:
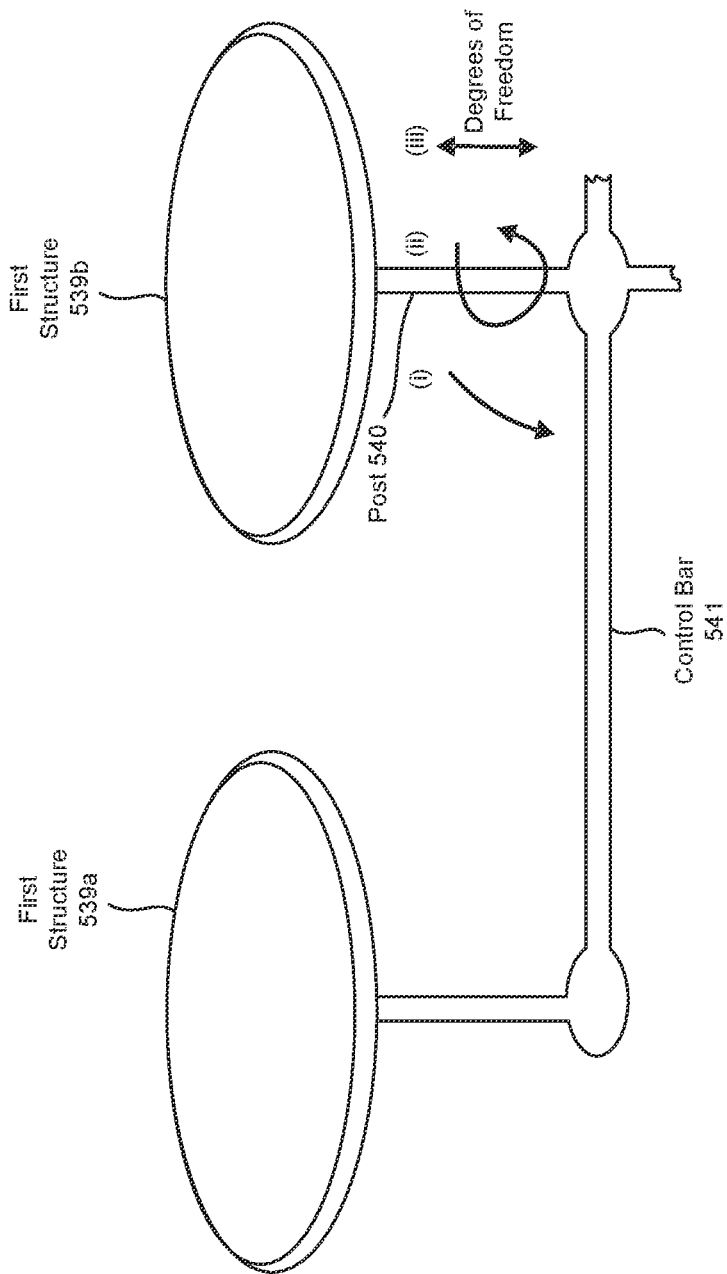
FIG. 5 is a perspective view of exemplary first structures for use in a build plate, in accordance with various embodiments.

Rapid powder removal/exchange as described herein may be facilitated by different embodiments. For example, the first and second structures may have specific geometric features and other properties. FIG. 5 is a perspective view of exemplary first structures for use in a build plate, in accordance with various embodiments. First structures 539*a* and 539*b* are shown, although in a practical application, any number of combined first structures may be used, including entire array of first structures used to maximize the speed of powder removal. Each structure 539*a-b* may be elliptical or circular in shape, or may use another geometry. Each structure 539*a-b* may be coupled to two or more neighboring structures via an element such as a control bar 541. In some embodiments, control bar 541 may be automatedly movable by a motor or other powered device to bring the first structures 539 into the various open, closed and intermediate modes as necessary (see, e.g., FIG. 3). Each structure 539*a-b* may include a post 540 that stems up from the control bar 541. Like the control bar 541, the post may in some embodiments have further degrees of freedom. For example, post 540 may be rotatable and/or movable in the vertical or horizontal directions to rotatably connect to an open aperture on a second structure (not shown) in one embodiment, and to rotatably move while concurrently moving downward in order to disengage the first structure 539*b* from the second structure during a powder removal. In some embodiments, the control bar 541 need not be present, and each first structure 539*a-b*, etc. may be associated with its own post 540 responsible for adjusting it in the various configurations. In some embodiments, post 540 may be arranged telescopically to extend and retract the first structure 539*b* as needed. In other embodiments, post 540 may extend and retract from a base device in a cavity of the PBF system 100 located underneath the build plate. In various embodiments, the crossbar 541 may be connected in array style to a corresponding array of first structures in order to help ensure that the motion of the array of first structures in and out of the apertures in the second structure is coordinated and concurrent. In short, the first structures may be controlled using a number of embodiments. In various embodiments, third and fourth structures, etc. may be used as necessary, e.g., where a build plate having a geometric priority of motion is needed. In this latter set of embodiments, different structures may be engaged and disengaged from the second structure, causing powder removal to occur in greater quantities in certain locations and less so in other locations. This type of action may be militated by any number of design-specific objectives, such as the number of build pieces intended to be simultaneously rendered in one print job, the need for a specific structure to be removed of high temperature powder before lower priority structures, and the like.

In various embodiments, posts 540 and/or first structures 539 can be made of a shape memory alloy that can change shape based on temperature. For example, in some 3D printing processes, the build plate can be heated to and maintained at a temperature of 100-200 degrees C. during printing. Posts 540 and/or first structures 539 can be made of shape metal alloy that, at the heated temperature, takes a shape in which first structures 539 prevent powder from flowing through an aperture in the build plate. This can prevent powder removal during the printing, i.e., when the build plate is heated. The shape of posts 540 and/or first structures 539 can change when the build plate is cooled, e.g., after printing is completed, such that the powder is allowed to flow through the apertures. For example, the edges of first structures 539 may curl downwards at cooler temperatures and/or posts 540 may bend to create an opening between first structures 539 and the apertures. Cooling of the build plate may occur unaided after the printing, or cooling may be aided, for example, by a cooling circuit or device associated with the 3D printer. In various embodiments, the shape of the shape metal alloy in the heated state might not cause first structures to be perfectly flush with the tops of the apertures (i.e., the surface of the build plate). In this case, the dosing of powder for the first layer may be adjusted to account for the fact the first structures are not flush. For example, if the first structures are slightly below the tops of the apertures, the dosing can be increased to fill in the extra space.

Figure 6:
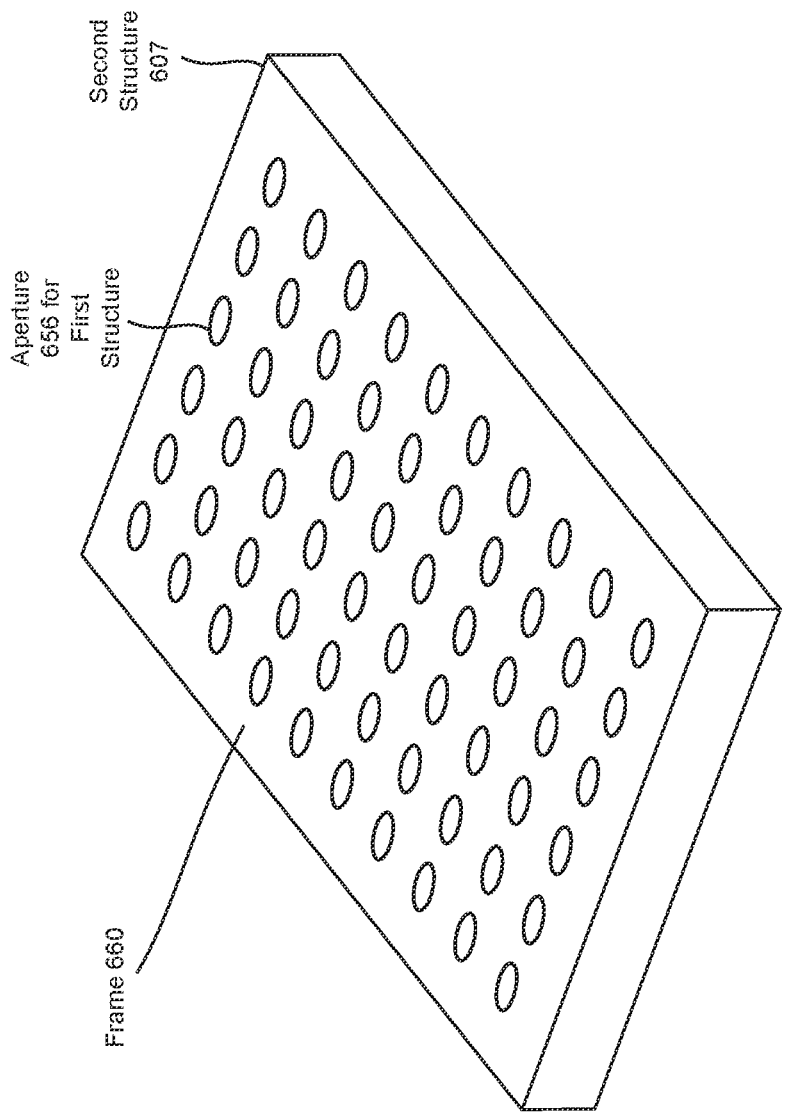
FIG. 6 is a perspective view of a frame including a second structure and apertures therein which may be connected to respective edges of first structures for providing a configurable build plate.

FIG. 6 is a perspective view of a frame constituting a second structure in which the first structures of FIG. 5 may be implemented for rapid powder removal. FIG. 6 is the type of frame that may be used, for example, in combination with an array or grid-like assembly of first structures. In some embodiments, the first structures may be rotatably connected with internal edges of the corresponding array of apertures 656. The first structures of FIG. 6 may in various embodiments be sealed with corresponding edges of the apertures 656. In some cases a special rubber may be used to effect a temporary seal. In other embodiments, one of the apertures and the edges of the first structures may include ridges, and the other of the apertures and edges may include contoured shapes that fit into the respective ridges to form a seal, similar in some respects to how a cap fits on a bottle. The second structure 607 is part of a frame 660 that can provide support to a build piece for rapid powder removal. It is also noteworthy that the frame has enough area on it to enable a PBF system to fuse build pieces, at least in part, to its surface. Some build pieces may be big enough so as to actually obstruct the flow of powder during a powder removal. However, the larger array of first structures should have more than enough apertures that can accommodate the powder removal even if a few apertures are blocked by the sheer size of the build piece. This is one of several benefits of using a build piece with a plurality of first structures and/or second structures. In some embodiments, zones of powder removal may be established where a first powered apparatus is configured to open or separate first structures from second structures and enable a first powder flow across a first portion of a build plate, a second apparatus is configured to open third structures from fourth structures and enable a second powder flow across a second portion of the build plate, and so on. In many embodiments, however, it may be desirable to dump all powder at one time, in which case the build plate may be configured to open and separate all in one small span of time.

Figure 7:
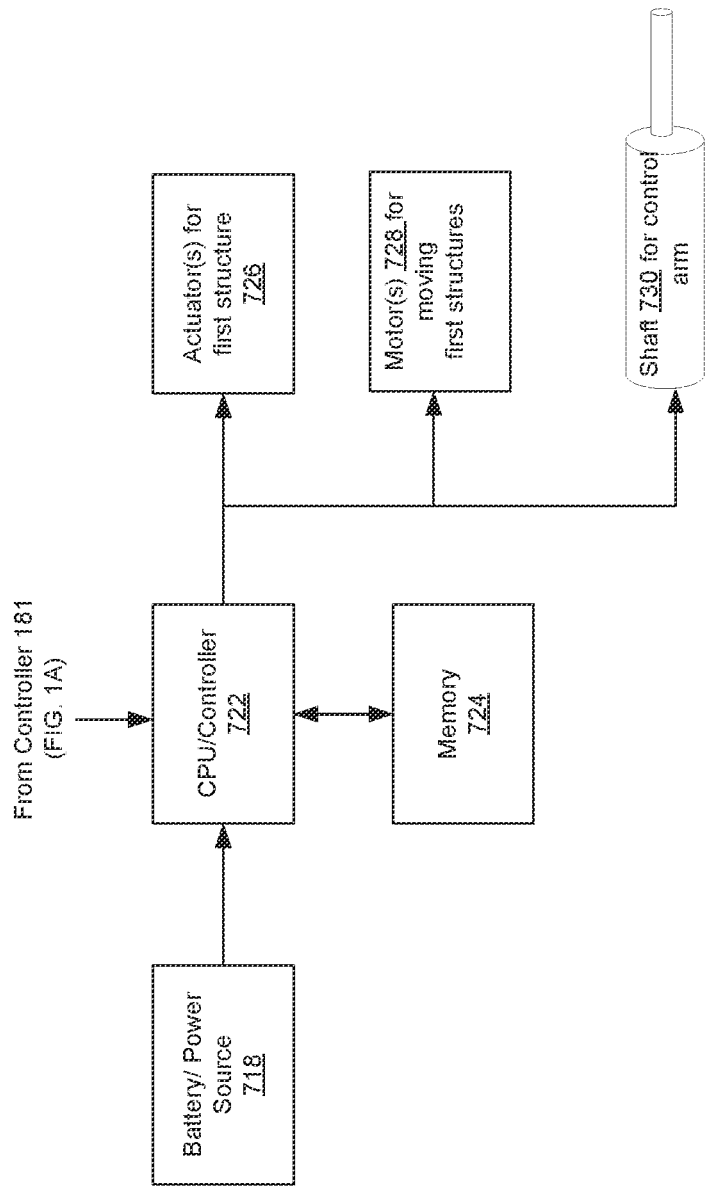
FIG. 7 is a block diagram of an illustration of an electric power circuit for providing mechanical power to enable relative motion of structures in a build plate for effecting powder removal.

FIG. 7 is a block diagram of an illustration of elements for providing mechanical power to enable relative motion of structures in a build plate for effecting powder removal. Initially it should be noted that one or more CPUs 722 may be local to the areas adjacent the build plate. In some embodiments, each of the CPUs 722 may receive wiring from the controller 181 and may receive powder removal instructions, instructions to reconfigure the build plate, and the like. In some embodiments, CPUs 722 are not needed as controller 181 or other circuitry (such as a workstation networked to the PBF system) may provide instructions directly to the components that control the build plate. In other embodiments, the build plate region may house one central CPU 722 or controller for controlling the movement of the entire build plate and/or its constituent first and second structures during a powder removal or exchange. In any embodiment where CPUs 722 are present, the term "CPU" is intended to encompass any electronic circuit capable of issuing instructions to or otherwise controlling the actions of actuators, motors, shafts, and other devices for controlling mechanical motion. Thus, CPUs 722 may constitute a processor with a plurality of cores. CPUs 722 may include a controller or a dedicated logical circuit, for example which can be physically wired to the subsystems that it is intended to control. Where CPU/controller 722 is a processor, it may be a generic processor or a special purpose processor, running a general code set or a specialized set of instructions. Build preparation software or other code can be used in various implementations to account for the positioning of the build piece relative to the part apertures, channels, build plate edges, etc., to ensure that the positioning of the build piece or the support structures is secure, and does not interfere with the operation of the configurable build plate.

If needed, additional components, such as logic circuitry, capacitors, inductors, transistors, diodes, etc., may be included on a printed circuit board, with appropriate backup circuits and fuses to create redundancies and avoid acting as a bottleneck during the powder removal process. CPU 722 may be in some embodiments more akin to a hardware switch that provides one or a few different indications to its components to engage or to disengage, for example. In some embodiments, CPU 722 represents a processor or plurality thereof that are coupled to controller 181 as shown in order to work in concert with the rest of the PBF system as it moves through its various cycles of operation. A clock may be used to provide precise timing, such as with an on-board crystal oscillator. In some embodiments, CPU 722 may be acting through a network, in which case a network transceiver may also be present, as well as one or more antennae in the case of a wireless network.

A battery or power source 718 may be needed to provide power to the various circuits and/or to provide a sufficient source of mechanical power to the components that drive the build plate structures. In various embodiments, the source of energy is provided from a socket, and a proportion of that current flows to the other components in FIG. 7. These components may be one or more actuators 726, or components of a machine responsible for moving and controlling parts of a system, such as by moving the first structures downward and out of their connections. The actuators 726 can perform this task by receiving an appropriate authorization signal from CPU 722 and, using the energy supplied it via the power source 718, can move or turn the structures in one or more directions. An array of actuators may be provided to accommodate movement in different directions. Similarly, one or more motors 728 may accomplish a similar task, by controlling certain structures of the build plate, and e.g., by locking the build plate in place after a powder removal has completed. In various embodiments, one or more shafts 730 may be used, for example, to provide torque. In a case where first structures are rotatably coupled to edges of apertures in the second structures, the shafts 730 may be used to twist a connector bar or set thereof coupled to the first structures and thereby open the first structures by rotatably releasing them. The structures may thereupon be moved downward by a motor 728 or other component.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A three-dimensional (3-D) printer, comprising:
   a build chamber configured for a build plate;
   a hopper for storing first powder;
   a depositor connected to the hopper, the depositor for depositing sequential layers of the first powder into a powder bed on the build plate;
   an energy beam source for selectively fusing the deposited layers to form a build piece, whereby unfused first powder remains in the powder bed,
   wherein the build plate comprises
      first structures for supporting the unfused first powder on a top of the build plate when the first structures are in a closed configuration and that transition to an open configuration via a piston coupled to the first structures to expose paths for allowing the unfused first powder or portion thereof to pass through the build plate, and
      a second structure having a static portion for preventing the build piece from passing through the build plate when the first structures are in the open configuration,
   wherein the first structures are aligned with the top of the build plate when in the closed configuration to form a flat surface for supporting the deposited layers of the first powder, and
   a vertical roller that facilitates transitioning the first structures between the closed configuration and the open configuration.

2. The 3-D printer of claim 1, wherein the second structure is configured to support a support structure of the build piece, whereby the second structure prevents the build piece from passing through the build plate when the first structures are in the open configuration.

3. The 3-D printer of claim 2, wherein the second structure includes apertures, and the first structures are rotatably coupled to respective edges of the apertures and rotate downward during transitioning to the open configuration.

4. The 3-D printer of claim 2, wherein the second structure includes a grid-like assembly having the static portion comprising a frame.

5. The 3-D printer of claim 4, wherein the first structures in the closed configuration form a seal with the frame.

6. The 3-D printer of claim 1, wherein the first structures are configured to transition to the closed configuration after the unfused first powder or portion thereof has passed through the build plate.

7. The 3-D printer of claim 1, further comprising a receiving cavity arranged in a housing underneath the build plate, wherein the unfused first powder or portion thereof passes through the build plate into the receiving cavity when the first structures are in the open configuration.

8. The 3-D printer of claim 1, further comprising a controller configured to control the first structures to transition to the open configuration.

9. The 3-D printer of claim 1, wherein the build plate includes a static portion for supporting the build piece when the first structures are in the closed configuration and when the first structures are in the open configuration, the 3-D printer further comprising a controller configured to provide instructions to the energy beam source to form one or more support structures that extend from the static portion of the build plate to the build piece.

10. The 3-D printer of claim 1, further comprising a second hopper to store second powder, the second hopper being configured to at least partially fill the build chamber after the unfused first powder or portion thereof has passed through the build plate and the first structures have transitioned to the closed configuration.

11. The 3-D printer of claim 1, wherein the build chamber is configured to receive second powder pre-cooled to a desired temperature after the unfused first powder or portion thereof has passed through the build plate and the first structures have transitioned to the closed configuration.

12. The 3-D printer of claim 1, wherein the paths include paths with openings in the top of the build plate and openings in a bottom of the build plate.

13. The 3-D printer of claim 1, wherein the paths include paths with openings in the top of the build plate and openings in a side of the build plate.

14. A method for three-dimensional (3-D) printing including a build chamber configured for a build plate, a hopper for storing first powder, a depositor connected to the hopper for depositing sequential layers of the first powder into a powder bed on the build plate, an energy beam source for selectively fusing the deposited layers to form a build piece, and a vertical roller, whereby unfused first powder remains in the powder bed, the method comprising:
supporting, using first structures, the unfused first powder on a top of the build plate when the first structures are in a closed configuration, wherein the first structures are aligned with the top of the build plate when in the closed configuration to form a flat surface for supporting the deposited layers of the first powder;
transitioning the first structures to an open configuration via a piston coupled to the first structures and facilitated by the vertical roller to expose paths for allowing the unfused first powder or portion thereof to pass through the build plate; and
preventing, using a static portion of a second structure, the build piece from passing through the build plate when the first structures transition to the open configuration.

15. The method of claim 14, further comprising supporting by the second structure a support structure of the build piece, whereby the second structure prevents the build piece from passing through the build plate when the first structures are in the open configuration.

16. The method of claim 15, further comprising:
rotatably coupling the first structures to respective edges of apertures of the second structures; and
rotating the first downward during transitioning to the open configuration.

17. The method of claim 15, wherein the second structure includes a grid-like assembly having a static portion comprising a frame.

18. The method of claim 17, further comprising forming a seal by the first structures with the frame when the first structures are in the closed configuration.

19. A build plate for a three-dimensional (3-D) printer, the 3-D printer comprising a re-coater for applying layers of powder into a powder bed having the build plate at its base, and an energy source for selectively fusing the layers of powder to form a build piece, the build plate comprising:
first structures for supporting unfused first powder on a top of the build plate when the first structures are in a closed configuration and that transition via a piston coupled to the first structures to an open configuration to expose paths for allowing the unfused first powder to pass through the build plate, and
a second structure having a static portion for preventing the build piece from passing through the build plate when the first structures are in the open configuration,
wherein the first structures are aligned with the top of the build plate when in the closed configuration to form a flat surface for supporting deposited layers of the first powder, and
wherein a vertical roller facilitates transitioning the first structures between the closed configuration and the open configuration.

20. The build plate of claim 19, wherein the first structures are independently movable between the closed configuration, the open configuration, and a partway open configuration.

21. The build plate of claim 19, further comprising a control bar coupling two or more first structures.

22. The build plate of claim 21, wherein the control bar is automatedly movable to move the first structures between the closed configuration, the open configuration, and a partway open configuration.

23. The 3-D printer of claim 1, wherein the piston is configured to rotate and move the first structures downward to transition the first structures to the open configuration.

24. The 3-D printer of claim 1, wherein the second structure is connected to and temporarily sealed with edges of the first structures.

* * * * *